US012670347B2

(12) United States Patent
Schütz et al.

(10) Patent No.: US 12,670,347 B2
(45) Date of Patent: Jun. 30, 2026

(54) CAMERA DEVICE AND METHOD FOR READING OPTICAL CODES

(71) Applicant: SICK AG, Waldkirch (DE)

(72) Inventors: Frank Schütz, Waldkirch (DE); Pascal Schüler, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 18/890,040

(22) Filed: Sep. 19, 2024

(65) Prior Publication Data

US 2025/0094747 A1 Mar. 20, 2025

(30) Foreign Application Priority Data

Sep. 20, 2023 (EP) ..................................... 23198418

(51) Int. Cl.
*G06K 7/10* (2006.01)

(52) U.S. Cl.
CPC ..... *G06K 7/10861* (2013.01); *G06K 7/10841* (2013.01); *G06K 2007/10485* (2013.01)

(58) Field of Classification Search
None
See application file for complete search history.

(56) References Cited

U.S. PATENT DOCUMENTS

| | | | |
|---|---|---|---|
| 9,501,683 B1 | 11/2016 | Hatstat et al. | |
| 10,248,896 B2 * | 4/2019 | Gao ..................... | G06K 7/1413 |
| 10,304,201 B2 | 5/2019 | Gao | |
| 10,438,035 B2 * | 10/2019 | D'Ercoli ................ | G06V 20/64 |
| 2014/0036069 A1 * | 2/2014 | Gehring ............ | G06K 7/10861 |
| | | | 348/135 |
| 2014/0270539 A1 | 9/2014 | Wang et al. | |

(Continued)

FOREIGN PATENT DOCUMENTS

| | | |
|---|---|---|
| DE | 102004017504 A1 | 10/2005 |
| EP | 2693364 A1 | 2/2014 |

(Continued)

OTHER PUBLICATIONS

European Search Report dated Feb. 27, 2024 corresponding to application No. 23198418.8-1205.

(Continued)

*Primary Examiner* — Thien M Le
*Assistant Examiner* — April A Taylor
(74) *Attorney, Agent, or Firm* — Nath, Goldberg & Meyer; Jerald L. Meyer

(57) ABSTRACT

A camera device for reading optical codes is provided that has at least one first camera unit having a first camera controller and a first image sensor for recording image data from a first detection zone, that has second camera unit having a second camera controller and that has a second image sensor for recording image data from a second detection zone that overlaps at least partially with the first detection zone, and that has a common control unit, wherein the respective camera controller is configured to locate regions of interest having optical codes in the image data and to transmit the image data of the regions of interest to the common controller. In this respect, the common controller is configured to combine the image data in regions of interest recorded by more than one camera unit and to read an optical code in the region of interest therefrom.

19 Claims, 2 Drawing Sheets

(56) References Cited

U.S. PATENT DOCUMENTS

| 2018/0040150 A1 | 2/2018 | Saporetti |
| 2018/0218190 A1* | 8/2018 | Nadabar ............ G06K 7/10544 |
| 2019/0073785 A1* | 3/2019 | Hafner ................... G06T 7/194 |
| 2022/0284383 A1 | 9/2022 | Chaubard |
| 2023/0097019 A1* | 3/2023 | Narendra ................. G06F 3/14 |
| | | 382/103 |

FOREIGN PATENT DOCUMENTS

| EP | 3109792 A1 | 12/2016 |
| EP | 3454298 A1 | 3/2019 |

OTHER PUBLICATIONS

Donald G Bailey, "Super-resolution of bar codes"; Institute of Information Sciences and Technology, Massey University, New Zealand; Nov. 1998.

* cited by examiner

S1
Record image

S2
Segment (find ROIs having potential codes)

S3
Convert ROI positions into global coordinates using a camera model

S4
Transmit ROIs together with positions in global coordinates to common controller

CAMERA DEVICE AND METHOD FOR READING OPTICAL CODES

FIELD

The invention relates to a camera device and to a method for reading optical codes respectively.

BACKGROUND

Reading optical codes is known from supermarket checkouts, for automatic parcel identification, for sorting mail shipments, from baggage handling at airports, and from other logistics applications. In a code scanner, a reading beam is guided transversely over the code by means of a rotating mirror or by means of a polygon mirror wheel. A camera based code reader records images of the objects having the codes located thereon by means of an image sensor and image evaluation software extracts the code information from these images.

In an important application group, the objects bearing the code are conveyed past the code reader. A variant of camera based code readers uses a line scan camera to read the object images having the code information successively and linewise with the relative movement. A scanning code reader also detects the remission and thus ultimately the image lines that can be assembled to form an object image, even though an image sensor is preferred for this purpose in practice. Another variant of camera based code readers as a rule records image data using a two-dimensional image sensor that overlap one another more or less depending on the recording frequency and on the conveying speed.

An individual camera is often not sufficient to record all the relevant information on the objects on a conveyor belt. A plurality of sensors are therefore combined in a reading system or a reading tunnel. If a plurality of conveyor belts are disposed next to one another to increase the object throughput or if a widened conveyor belt is used, a plurality of sensors mutually complement one another with respect to their fields of view, which are narrow per se, to cover the total width. In addition, cameras are installed at different positions to record codes from all sides (omni reading).

The individual cameras are combined in a master-slave system within a reading tunnel. The respective cameras record images of objects having codes, identify possible code regions therein, and read their code content still within the camera. The reading result is then forwarded to the master. The same reading results from the same objects that were recorded and decoded by different cameras are recognized there and redundancies are eliminated or registered as confirmation. The accumulated reading results are then forwarded by the master to a host, for example in the form of a cloud of the operator of the conveying system.

The most important quality criterion of a reading tunnel is its reading rate, more exactly the demand of reading all the codes correctly where possible. Incorrect readings or no readings result in expensive and usually manual reworking. A frequent reason for a reading error is insufficient image quality of a detected code. In principle, techniques such as super-resolution processes are known to upgrade the image quality. However, the master has no possibility of using such processes since only reading results are communicated to it. The transfer of all the image data from the cameras to the master would, on the other hand, make extreme demands on the bandwidth and processing power of the master.

The paper Bailey, Donald G. "Super-resolution of bar codes", Journal of Electronic Imaging 10.1 (2001): 213-220 describes how a plurality of images recorded from perspectives slightly skewed with respect to one another are combined to form an image with higher resolution to read a barcode. However, a reading tunnel does not at all offer the requirement to record such images.

DE 10 2004 017 504 A1 records images offset in time with a camera and assembles partial images of codes to form a total view. In this respect, the use of a plurality is directly avoided. The aim of the image processing is not a higher image quality, but rather the detection of a total code even when every single image only contains fragments thereof.

In EP 2 693 364 A1 a plurality of images are recorded by a plurality of partial cameras in partially overlapping detection zones and are assembled to form a common image. In a region of interest having a code, only image information of a partial camera is explicitly used so that a code region remains free of artifacts of stitching. This includes an upgrading of the image quality from a multiple recording of the region of interest.

It is known from U.S. Pat. No. 9,501,683 B1 to record an image zone multiple times with image sensor arrays offset from one another by a fraction of a pixel. A higher resolution image is then reconstructed from the offset image information. This is ultimately nothing but a special implementation of a line scan camera with a higher resolution.

U.S. Pat. No. 10,304,201 B2 fuses a plurality of image zones using position data of the image zones that are stored in a look-up table. In this respect, it is a mutual complementing, not redundant recordings of regions of interest. A resolution increase would thus not even be possible and is also not discussed.

In US 2014/0270539 A1 a consecutively recorded image series of a code region is used to acquire a higher quality image and thus to read the code. There is only one single camera here.

US 2018/0040150 A1 reconstructs a code over the recording zones of a plurality of cameras. In an embodiment, two cameras record a zone in an overlapping manner but for a stereo image and not to upgrade the image quality.

SUMMARY

It is therefore the object of the invention to improve the reading of codes with a camera device.

This object is satisfied by a camera device and by a method for reading optical codes in accordance with the respective independent claim. The camera device can be configured depending on the desired use for the reading of simple barcodes or 1D codes and 2D codes in accordance with any of the various known standards. Two or more cameras are provided that each have an image sensor and a camera controller. The fields of vision, reading zones, or detection zones of the cameras overlap at least in part. A code can be detected multiple times by different cameras in the overlap zone thereby resulting. The cameras are each connected to a common controller that preferably acts as a master in a network of the cameras or in a reading tunnel. Alternatively, one of the camera controllers can acts as a master in a dual function.

The respective camera controllers carry out a segmentation of the recorded image data to locate regions of interest having optical codes. In this respect in this connection, optical codes initially only mean code candidates that are recognized, for example, at a high image contrast or using another segmentation process known pe se since whether an optical code can actually be read will only be determined subsequently in the further image processing. The respective camera controller transmits the image data of the regions of interest to the common controller. Only image data within the regions of interest are preferably transmitted to keep the data volume low. If the respective camera controller is spoken of, this means that it relates to two camera units or, if present, also a third, fourth, and further camera unit. It conversely remains permitted in this respect that there are cameras in the network that have different designs and thus do not contribute to at least some aspects of the invention.

The invention starts from the basic idea of combining together regions of interest having optical codes recorded at least twice or even multiple times by different camera units to acquire higher quality image data. A decoding, that is the reading of the optical code recorded in the region of interest, then follows using these higher quality image data.

The invention has the advantage that the image quality and thus ultimately the reading rate can be increased in the common controller. The data volume is kept low in this respect by transmitting the image data of the regions of interest so that the demands on the bandwidth and the processing resources remain moderate.

The common controller is preferably configured to combine image data in regions of interest recorded by more than one camera unit with a super-resolution process. An image arises comparable with a recording with a higher image resolution. The multiple pieces of information of a region of interest is thus particularly advantageously utilized.

The common controller is preferably configured to combine image data in regions of interest recorded by more than one camera unit in that image sections that a camera unit has not recorded or has recorded in poor quality are replaced with image sections of a different camera unit. A single camera frequently records an optical code incompletely, for example due to a reflection, in particular with a code beneath a film. The image of a different camera in its deviating perspective will as a rule not have such defective positions exactly in the same zone. It is thus often possible to mutually fill such gaps and nevertheless to decode illegible code from the single image. A further reason for gaps in the image sections of a camera can be that the code has only partially been located in its detection zone.

The combination possibilities are by no means exclusively listed by super-resolution and mutual complementing of gaps or imperfections and it is also conceivable to use a plurality of combination processes together. Further alternatives include an averaging of image data of different cameras, a summing of brightness values, or the use of a process of machine learning, in particular of a neural network. The latter is trained, for example, using a plurality of recordings of a region of interest that can also be artificially generated and using an associated ideal image of the code contained in the region of interest.

The respective camera controller is preferably configured to determine the position of a located region of interest in global coordinates and to transmit the global coordinates to the common controller. The respective camera detects regions of interest initially only with respect to its image sensor in pixel coordinates or camera coordinates. In this respect, there is no comparability with the recordings of other cameras that is provided by a conversion into global coordinates. The requirement for this is an initial calibration to know a camera model and the position with respect to the other cameras or to the global coordinate system (registration). The camera also transmits its position in the calculated global coordinates together with a respective region of interest.

The respective camera controller preferably transmits the position of a located region of interest in camera coordinates to the common controller and the common controller is configured to convert the camera coordinates into global coordinates. This is a central alternative to the determination of positions in global coordinates in the individual cameras explained in the previous paragraph. An initial calibration or registration is also required for this purpose. In addition, the common controller has to be aware of the camera models of the connected cameras. This can be communicated to the common controller by the cameras, for example during an initialization, or the common controller has previously stored corresponding information that it can suitably invoke using a camera type.

The common controller is preferably configured to recognize which regions of interest have been recorded by more than one camera unit with reference to the position of the regions of interest in global coordinates. With the global coordinates, the common controller has comparability and a very simple criterion to recognize the regions of interest to be combined and recorded multiple times.

The camera device preferably detects a stream of objects having optical codes moved relative to the camera device and is in particular installed as stationary at a conveying device on which objects having optical codes are conveyed. This corresponds to the frequent application situation explained in the introduction. In this respect, there are real time demands under which the invention can exploit its advantages particularly well. In this respect, all the codes should namely be read where possible with little effort using the existing recordings. Simple error strategies such as the repeat recording of images in the event of a code that has not been read cannot be implemented. The camera units preferably together cover the width of the stream of objects.

The respective camera controllers are preferably configured to simultaneously record image data from which the common controller combines regions of interest. The recordings can be generated in parallel using the plurality of camera units. At the same time, tolerances are permitted within a practically sensible framework here. In a largely static scene as in a presentation application, larger tolerances are permitted here than in a highly dynamic scene. It is also conceivable to compensate the intermediate movement by calculation on a time offset. This is possible with particularly little processing effort with a uniform movement such as on a conveying belt where a time difference is proportional to an intermediate displacement with the conveying speed as a proportionality constant.

The detection zones of the camera units preferably overlap such that every optical code of a maximum dimension is detected by at least two camera units. There is therefore full redundancy or the relevant reading zone is within the overlap zone. With more than two camera units, a respective pair-wise overlap is sufficient, with greater redundancy not being precluded. A maximum dimension of the optical code is named because the overlap condition can only be satisfied for limited dimension sizes. Codes that are larger than the maximum dimension are possibly only partially detected by more than one camera depending on the situation. A combination can then still be useful to combine partial detections to form a total image of the code.

The first camera controller and/or the second camera controller is/are preferably configured to read a code in a region of interest and to transmit the decoding result to the common controller. The individual cameras are therefore themselves able to read codes in this embodiment and are thus camera based code readers. Very high reading rates are thus typically already reached so that only the few problems cases still remain to which the existing resources can be bundled there for the combination in the common controller. Regions that will be of interest, whose codes a camera could already read itself, are preferably no longer transmitted to the common controller. Only the comparatively few data of the reading result then take up transmission bandwidth. It is conceivable that only partial reading results are also transmitted and the common controller attempts to achieve a valid reading result on this level with a partial reading result of a different camera. In an alternative embodiment, the camera controllers do not themselves decode, but the total decoding rather remains reserved for the common controller, also for codes only recorded once and/or readable without problem. A work division is furthermore conceivable in which some regions of interest are evaluated in the cameras and some in the common controller. A camera, for example, then also sends some regions of interest in addition to the regions of interest in which they could not read any code to the common controller for which they currently simply do not have the processing capacity without having exclusively attempted at all whether the code would already have been readable without a combination with regions of interest.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
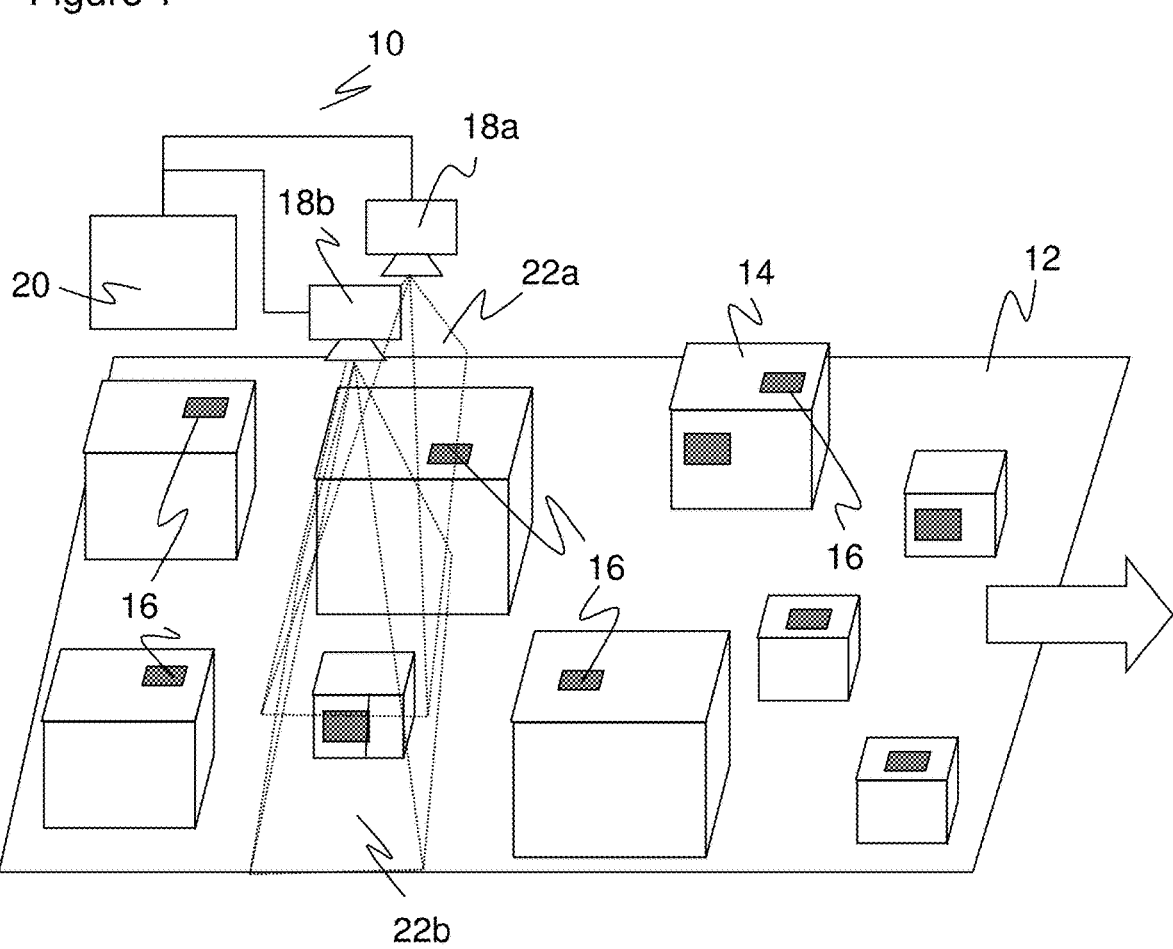
FIG. 1 a schematic three-dimensional plan view of a camera device at a conveyor belt having objects to be detected.

FIG. 1 shows a schematic three-dimensional plan view of a camera device 10 at a conveyor belt 12 with objects 14 to be detected on which codes 16 have been applied. The conveyor belt 12 is an example for the production of a stream of objects 14 which move relative to the stationary camera apparatus 10. Alternatively, the camera device 10 can be used in connection with unmoving objects, for example in a so-called presentation application in which objects are directly held in the reading zone of the camera device 10.

The camera device 10 comprises at least two cameras 18a-b and a common controller 20 to which both cameras 18a-b are connected. The detection zones 22a-b of the cameras 18a-b overlap one another, preferably as shown in the transverse direction of the conveyor belt 12. The degree of overlap shown should be understood purely by way of example and can also differ considerably in other embodiments. However, the advantage still to be explained in accordance with the invention of a reading rate improved by a combination of recordings of a plurality of cameras 18a-b can only be achieved in an overlap zone. A large or even complete overlap is therefore preferred. If more than two cameras 18a-b are used, different overlaps of different degrees result, with pair-wise overlaps being sufficient for an improved code reading by a combination of recordings and will there thereby be a large number of possible configurations to redundantly detect a large total zones using a plurality of cameras.

Figure 2:
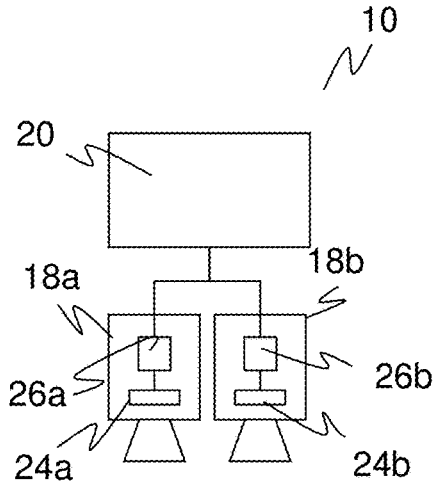
FIG. 2 a very simplified block diagram of a camera device.

FIG. 2 shows the design of the camera device 10 again in a very simplified block diagram. The cameras 18a-b each have, in addition to elements not further explained such as an objective, a possible housing, and the like, respectively an image sensor 24a-b having a plurality of light reception elements arranged to form a pixel row or a pixel matrix and a camera controller 26a-b. The respective camera controller 26a-b comprises at least one digital processing module such as at least one microprocessor, at least one FPGA (field programmable gate array), at least one DSP (digital signal processor), at least one ASIC (application specific integrated circuit), at least one VPU (video processing unit), or at least one neural processor. A pre-processing on a separate digital processing module is in particular frequently outsourced in code reading applications for pre-processing steps such as a rectification, a brightness adaptation, a binarization, a segmentation, the locating of regions of interest (ROIs), especially code regions, and the like. Further image processing after this pre-processing then preferably takes place in at least one microprocessor.

The controller 20 preferably acts as a master for the communication within the camera device 10. It can in this respect be a dedicated superior controller in an actual sense, another connected processing unit, the part of a further network, an edge device, or a cloud. Alternatively, the work of the controller 20 can be taken over by a camera controller 26a-b that thus obtains a dual function.

Figure 3:
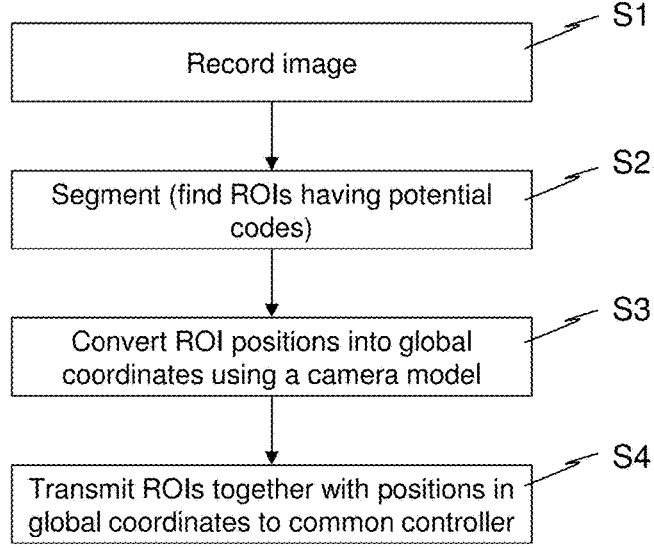
FIG. 3 an exemplary flowchart of the image recording and image processing or image pre-processing in the individual cameras.

FIG. 3 shows an exemplary flowchart of the image recording and image processing or image pre-processing in the individual cameras 18a-b. The camera 18a-b records an image in a step S1. The image is segmented in a step S2, that is it is searched for possible codes. Corresponding segmentation processes that look, for example, for zones having high black and white contrasts typical for optical codes are known pe se so that this step will not be described in more detail. No decoding takes place here. The result is, for example, a list of regions of interest still in the form of pixel locations, i.e. with respect to the image.

In a step S3, the pixel locations are converted into global coordinates using a camera model. The cameras 18a-b are calibrated or registered among one another for this purpose so that the required transformations are known. In a step S4, the image sections of the found regions of interest having possible codes are transmitted to the common controller 20 together with the position in global coordinates.

It is conceivable in principle that the conversion from pixel locations into global coordinates only takes place in the common controller 20. For this purpose, information on the transmitting camera 18a-b then has to be transmitted to a region of interest and the common controller 20 has to know the required transformation, for example by transmitting the transformation or corresponding calibration data for the calculation of the transformation as part of an initialization. In a further embodiment, the camera 18a-b attempts to nevertheless read the respective code itself in an additional step, not shown, between steps S2 and S3. If this is successful, the reading results are transmitted instead of the region of interest as conventionally. Steps S3 and S4 only follow when the camera 18*a-b* itself is not successful in decoding or if it recognizes that the image quality is not sufficient for a successful decoding. The common controller 20 is therefore only responsible for the problematic cases in this further embodiment. In a further alternative, the respective camera 18*a-b* initially follows the routine of FIG. 3 and uses a time window that may remain until the next image recording for its own decoding attempts. In this case, it may be advantageous for the camera 18*a-b* and the common controller to each inform one another when a code has been read or for a sequence of the processing of the regions of interest to be fixed or agreed together so that the camera 18*a-b* and the common controller 20 work on different codes where possible.

Figure 4:
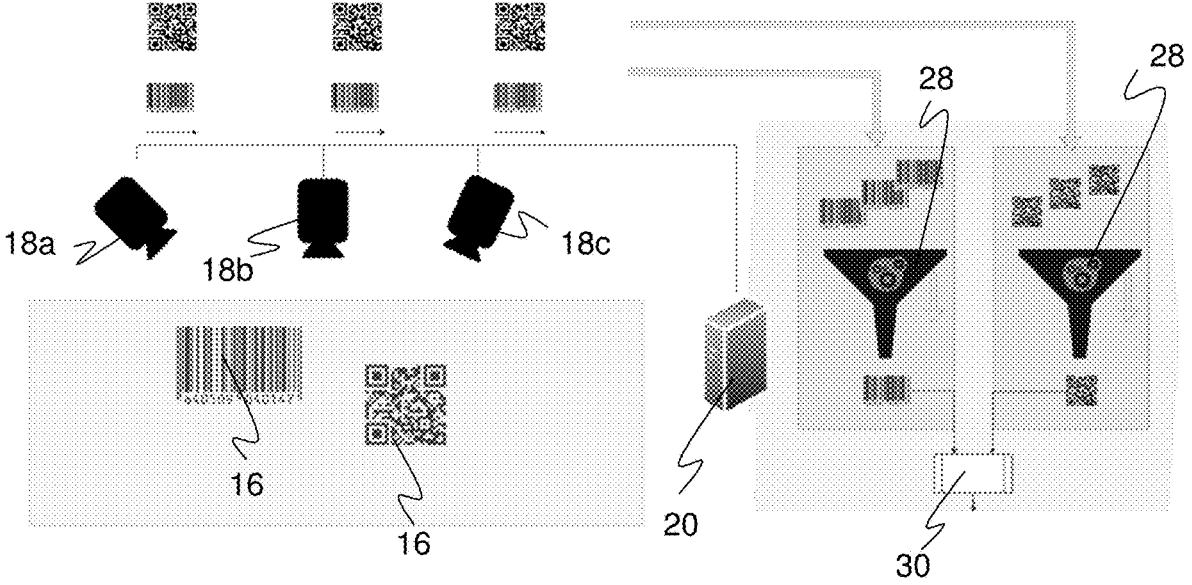
FIG. 4 an illustration of the routine of the code reading in the camera device.

FIG. 4 shows an illustration of the routine of the code reading in the camera device 10. The routine described with respect to FIG. 3 is illustrated again in abbreviated form on the left side. There are now by way of example three cameras 18*a-c* instead of the previous two cameras 18*a-b* that record images, locate regions of interest having codes 16 therein, and transmit them together with the positions in global coordinates to the common controller 20. It has already been explained that a redundancy of the detection zones is requires so that the common controller 20 can increase the image quality of the regions of interest. In the example shown, even all three cameras 18*a-c* can detect the codes 16 shown by way of example.

As illustrated on the right side of FIG. 4, the common controller 20 receives the image sections of the regions of interest having the codes 16 transmitted by the respective cameras 18*a-c* together with their position in global coordinates. The common controller 20 can determine with reference to the global coordinates which regions of interest correspond to the code 16. For this purpose, the positions comparable over the cameras 18*a-c* in the global coordinates have to coincide within certain tolerances, with the tolerances being able to be derived from fractions of the dimensions of the codes to be read or of the respective region of interest. In the example shown, the comparison in global coordinates shows that both the barcode and the 2D code have each been recorded three times and the corresponding regions of interest can be associated with one another.

In a schematically shown fusion 28, the redundantly transmitted regions of interest can be combined with one another to achieve a higher image quality. In this respect, different codes can be processed, as shown, in parallel or alternatively consecutively. Different fusion algorithms are possible that can also be combined with one another. An example is a super-resolution process. The multiple recordings of the region of interest originate from different cameras 18*a-c*, which results in differences in the fields of vision of the pixels that can in turn be used for a resolution increase. Such methods are known per se and will therefore not be explained in more detail. A further example is a kind of mutual gap filling. Reflection zones in which the code is hardly visible or no longer visible at all frequently in particular occur on the reading of codes beneath film. Such reflection zones are, however, displaced from one another in the different perspectives. The image information from one camera 18*a-c* can therefore be compensated by that of a different camera 18*a-c*. In this respect, the respective reflection-free or lower reflection image information can be inserted alone or can be correspondingly overweighted, cut out, or underweighted corresponding to the image information disrupted by reflections. A further reason for a gappy detection of a code in a camera 18*a-c* can be due to the code having been located only partially in its detection zone 22*a-c*. A total image of the code then nevertheless results in many cases together from all the perspectives of the cameras 18*a-c*. Further examples of a fusion are averaging processes, quantile processes, or addition processes.

The image section prepared in this manner is then supplied to a decoder 30 of the common controller 20 that reads the code contained therein. This is successful due to the higher image quality with an improved reading rate. The reading results are then transmitted to a superior system, for example a network or a cloud of the operator of the conveyor belt 12. Provided that the cameras 18*a-c* themselves have carried out decoding attempts, their reading results are collected and likewise forwarded. Multiple readings are intercepted in the common controller 20 or this evaluation is left to the superior system. It is conceivable to output further information in addition to the simple reading results such as image data, in particular on the regions of interest, positions in global coordinates for an association with the object 14 bearing the code 16, and the like.

As FIG. 4 illustrates, 1D codes and 2D codes can be processed. Partial encodings can be assembled with 1D codes or barcodes. In this respect, however, a check should still be made whether it is the same code type and whether there are common signs that are suitable as a transition zone between two partial encodings. With 2D codes, the accuracy of the positions in global coordinates possibly do not yet suffice as input data of a fusion algorithm. A registration of the images of the 2D code can then take place to improve the location accuracy. It must finally again be emphasized that the common controller 20 fuses image sections or regions of interest that originate from recordings of different cameras 18*a-c*, preferably at the same point in time. The fusion is therefore immediately possible, not, as in the case of the evaluation of a sequence of a single camera 18*a-c*, only with a greater delay.

The invention claimed is:

1. A camera device for reading optical codes, the camera device comprising: at least one first camera unit having a first camera controller and a first image sensor for recording image data from a first detection zone, and that has a second camera unit having a second camera controller and a second image sensor for recording image data from a second detection zone that overlaps at least partially with the first detection zone, and that has a common controller, wherein the respective camera controller is configured to locate regions of interest having optical codes in the image data and to transmit the image data of the regions of interest to the common controller, wherein the common controller is configured to combine the image data in regions of interest recorded by more than one camera unit and to read an optical code in the region of interest therefrom, and wherein the respective camera controller is configured to determine a position of a located region of interest in global coordinates and to transmit the global coordinates to the common controller.

2. The camera device in accordance with claim 1, wherein the common controller is configured to combine image data in regions of interest recorded by more than one camera unit using a super-resolution process.

3. The camera device in accordance with claim 1, wherein the common controller is configured to combine image data in regions of interest recorded by more than one camera unit in that image sections that a camera unit has not recorded or has recorded in poor quality are replaced with image sections of a different camera unit.

4. The camera device in accordance with claim 1, wherein the common controller is configured to recognize which regions of interest have been recorded by more than one camera unit with reference to the position of the regions of interest in global coordinates.

5. The camera device in accordance with claim 1, wherein the camera device detects a stream of objects having optical codes moved relative to the camera device and is installed at a conveying device on which objects having optical codes are conveyed.

6. The camera device in accordance with claim 5, wherein the camera device is installed as stationary at the conveying device.

7. The camera device in accordance with claim 1, wherein the respective camera controller is configured to simultaneously record image data from which the common controller combines regions of interest.

8. The camera device in accordance with claim 1, wherein the detection zones of the camera units overlap such that every optical code of a maximum dimension is detected by at least two camera units.

9. The camera device in accordance with claim 1, wherein the first camera controller and/or the second camera controller is configured to read a code in a region of interest and to transmit the decoding result to the common controller.

10. A method of reading optical codes, the method comprising: at least one first camera unit that detects image data from a first detection zone and a second camera unit that detects image data from a second detection zone,
  wherein the camera units each locate regions of interest having optical codes in the image data and transmit the image data of the regions of interest to a common controller,
  wherein the common controller combines the image data in regions of interest recorded by more than one camera unit and reads an optical code in the region of interest therefrom,
  and wherein the respective camera units or the common controller converts the camera coordinates into global coordinates by the respective camera units determining a position of a located region of interest in global coordinates or the common controller converting the camera coordinates into global coordinates.

11. A camera device for reading optical codes, the camera device comprising: at least one first camera unit having a first camera controller and a first image sensor for recording image data from a first detection zone, and that has a second camera unit having a second camera controller and a second image sensor for recording image data from a second detection zone that overlaps at least partially with the first detection zone, and that has a common controller,
  wherein the respective camera controller is configured to locate regions of interest having optical codes in the image data and to transmit the image data of the regions of interest to the common controller,
  wherein the common controller is configured to combine the image data in regions of interest recorded by more than one camera unit and to read an optical code in the region of interest therefrom,
  and wherein the respective camera controller is configured to determine a position of a located region of interest in global coordinates and to transmit the global coordinates to the common controller,
  and wherein the respective camera controller transmits the position of a located region of interest in camera coordinates to the common controller and the common controller converts the camera coordinates into global coordinates.

12. The camera device in accordance with claim 11, wherein the common controller is configured to combine image data in regions of interest recorded by more than one camera unit using a super-resolution process.

13. The camera device in accordance with claim 11, wherein the common controller is configured to combine image data in regions of interest recorded by more than one camera unit in that image sections that a camera unit has not recorded or has recorded in poor quality are replaced with image sections of a different camera unit.

14. The camera device in accordance with claim 11, wherein the common controller is configured to recognize which regions of interest have been recorded by more than one camera unit with reference to the position of the regions of interest in global coordinates.

15. The camera device in accordance with claim 11, wherein the camera device detects a stream of objects having optical codes moved relative to the camera device and is installed at a conveying device on which objects having optical codes are conveyed.

16. The camera device in accordance with claim 15, wherein the camera device is installed as stationary at the conveying device.

17. The camera device in accordance with claim 11, wherein the respective camera controller is configured to simultaneously record image data from which the common controller combines regions of interest.

18. The camera device in accordance with claim 11, wherein the detection zones of the camera units overlap such that every optical code of a maximum dimension is detected by at least two camera units.

19. The camera device in accordance with claim 11, wherein the first camera controller and/or the second camera controller is configured to read a code in a region of interest and to transmit the decoding result to the common controller.

* * * * *